United States Patent
Nishio

(10) Patent No.: US 8,935,708 B2
(45) Date of Patent: Jan. 13, 2015

(54) COMMUNICATION SYSTEM AND COMMUNICATION APPARATUS AND CONTROL METHOD THEREOF

(75) Inventor: Masahiro Nishio, Higashiyamato (JP)

(73) Assignee: Canon Kabushiki Kaisha (JP)

( * ) Notice: Subject to any disclaimer, the term of this patent is extended or adjusted under 35 U.S.C. 154(b) by 1621 days.

(21) Appl. No.: 11/848,681

(22) Filed: Aug. 31, 2007

(65) Prior Publication Data

US 2008/0059978 A1    Mar. 6, 2008

(30) Foreign Application Priority Data

Sep. 1, 2006  (JP) ................................. 2006-238173

(51) Int. Cl.

| G06F 3/00 | (2006.01) |
| H04L 12/24 | (2006.01) |
| G06F 9/54 | (2006.01) |
| H04L 12/26 | (2006.01) |
| H04L 29/08 | (2006.01) |
| G06F 3/12 | (2006.01) |

(52) U.S. Cl.
CPC ............ *H04L 41/0677* (2013.01); *G06F 9/542* (2013.01); *H04L 43/0817* (2013.01); *H04L 67/16* (2013.01); *H04L 67/02* (2013.01); *G06F 3/1294* (2013.01)
USPC ........................................................ 719/318

(58) Field of Classification Search
CPC ...................................................... G06F 9/542
USPC ................................................. 719/318, 313
See application file for complete search history.

(56) References Cited

U.S. PATENT DOCUMENTS

| 6,734,985 B1 | 5/2004 | Ochiai |
| 6,751,657 B1* | 6/2004 | Zothner ........................ 709/220 |
| 7,356,540 B2* | 4/2008 | Smith et al. .......................... 1/1 |
| 7,594,267 B2* | 9/2009 | Gladstone et al. .............. 726/23 |
| 7,650,404 B2* | 1/2010 | Parupudi et al. .............. 709/224 |
| 7,818,674 B2* | 10/2010 | Koch ............................ 715/736 |
| 8,194,680 B1* | 6/2012 | Brandwine et al. ........... 370/398 |
| 8,533,343 B1* | 9/2013 | Beda et al. .................... 709/227 |
| 2003/0225870 A1 | 12/2003 | Sandadi |

(Continued)

FOREIGN PATENT DOCUMENTS

| JP | 2004-038956 A | 2/2004 |
| JP | 2004094311 A | 3/2004 |

(Continued)

OTHER PUBLICATIONS

Jane Cleland-Huang, Supporting Event Based Traceability through High-level Recognition of Change Events, 2002.*
Extended search report issued in corresponding European patent application No. 07115468.6-2416, dated Feb. 1, 2008.
"UPnP Device Architecture v1.0" URL:upnp.org/specs/arch/UPnP-arch-DeviceArchitecture-v1.0-20060720.pdf Jul. 20, 2006.

(Continued)

*Primary Examiner* — Lechi Truong
(74) *Attorney, Agent, or Firm* — Rossi, Kimms & McDowell LLP

(57) ABSTRACT

A client device issues an event notification request to a service-providing apparatus, and notifies the service-providing apparatus whether an event processing unit which processes the event for which the notification request has been issued is active. Upon detecting the occurrence of an event, the service-providing apparatus searches for client devices whose notification requests for the event have been registered, and notifies the occurrence of the event to a client device in which an event processing unit which can process the event is active.

11 Claims, 10 Drawing Sheets

(56) References Cited

U.S. PATENT DOCUMENTS

| | | |
|---|---|---|
| 2005/0254084 A1 | 11/2005 | Imoto |
| 2006/0056285 A1* | 3/2006 | Krajewski et al. ............ 370/216 |
| 2006/0077413 A1 | 4/2006 | Lum |
| 2006/0253593 A1* | 11/2006 | Jachner ......................... 709/227 |
| 2010/0257269 A1* | 10/2010 | Clark ............................ 709/226 |
| 2013/0051234 A1* | 2/2013 | Matsuoka ..................... 370/235 |

FOREIGN PATENT DOCUMENTS

| | | |
|---|---|---|
| JP | 2004-199382 A | 7/2004 |
| JP | 2004-362594 A | 12/2004 |

OTHER PUBLICATIONS

"Web Service Dynamic Discovery (WS-Discovery)" URL:specs.xmlsoap.org/ws/2005/04discovery/ws-discovery.pdf Apr. 2005.

"WS-MetadataExchange" URL:specs.xmlsoap.org/ws/2004/09/mex/WS-MetadataExchange.pdf Aug. 2006.

"Web Services Eventing" URL: www.w3.org/TR/ws-eventing/ Apr. 28, 2011.

Office Action Issued in Corresponding Japanese Patent Application No. 2006-238173 dated Jun. 20, 2011.

Japanese Office Action issued in counterpart application No. JP2006-238173, dated Mar. 23, 2012.

\* cited by examiner

F I G. 4

```
<SubscriptionTable>
        <SubscribeID  id= "aaaaaa ">  ⟶ 400
                <EventPort>http://aaa.bbb.ccc.ddd</EventPort> ⟶ 401
                <Status>ACTIVE | InACTIVE</Status> ⟶ 402
        </SubscribeID>

<SubscribeID id= "bbbbbb ">
                <EventPort>http://mmm.nnn.ooo.ppp</EventPort>
                <Status>ACTIVE | InACTIVE</Status>
        </SubscribeID>

***********

</SubscriptionTable>
```

F I G. 5

```
<Envelove>
        <Body>
                <SubscribeID>aaaaaa</SubscribeID>  ~500
                <Status>ACTIVE | InACTIVE</Status>  ~501
        </Body>
</Envelove>
```

COMMUNICATION SYSTEM AND COMMUNICATION APPARATUS AND CONTROL METHOD THEREOF

BACKGROUND OF THE INVENTION

1. Field of the Invention

The present invention relates to network communication apparatuses, a communication system including the apparatuses, and a control method for the system and the communication apparatus.

2. Description of the Related Art

Conventionally, there has been known a service-providing apparatus or system which provides various kinds of services in response to service requests from client apparatuses on a network. For example, with the rapid spread of Internet communication, various kinds of devices other than conventional personal computers have been developed as network devices. In addition to user interactive devices such as PDAs (Personal Digital Assistances) and cellular phones, various kinds of image processing apparatuses and home electric appliances have been made compatible with networks.

Along with this tendency, there has been proposed software for searching for network devices which provide various kinds of services in order to improve convenience and ease of use in using these network devices. In addition, there have been proposed various kinds of protocols and architectures which provide automatic setup means for application software, utility software, operating systems, and the like for controlling such network devices (Japanese Patent Laid-Open Nos. 2004-038956 and 2004-362594).

Several enterprises and standardization organizations have been making efforts to develop specifications so as to extend the plug and play function, which has been applied to local input/output connection devices, to network devices as well. These efforts include, for example, UPnp (registered trademark) (see UPnP Device Architecture v1.0), which Microsoft has been mainly developing, and BMLinks ("BMLinks", the Japan Business Machine and Information System Industries Association), which has been promoted by WSD: Web Services for Devices.

The network service systems exemplified above use protocols for notifying events, typified by GENA: General Event Notification, WS-Eventing, and the like. This allows a client device to grasp, in real time, a change in the status of a device which provides a service, that is, the processed state of a job which the device has requested to execute, an error status, a state change such as updating of configuration information (occurrence of event), or the like.

The above conventional techniques, however, suffer the following problems. According to an event notification protocol, a client device needs to issue an event notification request to a service-providing device in advance. The service-providing device must hold and manage all pieces of information concerning notification requests received from all client devices. When an event occurs, the service-providing device must notify all the client devices from which the notification requests have been received of the occurrence of the event. Of these events, events associated with changes in status accompanying the execution of a job can conceivably include a start job, job progress, job completion, error, and the like. In order to transmit the notifications of the occurrence of these events to all the clients from which notification requests have been received, it is necessary to ensure network connection including error recovery and the like. This imposes a heavy load on the service-providing device. In addition, this heavy load has caused, for example, the problem that failing to notify an important, urgent event will greatly delay event notification to network management tools.

On the other hand, it is conceivable that even if the service-providing device notifies a client device, from which a notification request has been received, of an event, the client device has no function of processing the event, that is, no function of analyzing the content of the event and notifying the user of the resultant information. In addition, in the client device, a function, application, utility, or the like which processes the event may not be activated (i.e. be invalid). In such a case, the notified event information and the process performed for notification are wasted.

In a service-providing device with limited hardware resources, a device used in a home network environment, in particular, or an environment such as an office in which many client devices exist, some contrivance is required to minimize wasteful event processing and wasteful event notification.

SUMMARY OF THE INVENTION

It is an object of the present invention to eliminate the above-described problems of the conventional technology.

A feature according to an aspect of the present invention is that unnecessary event notifications are substantially eliminated by notifying client apparatuses, of client apparatuses whose event notification requests have been registered, which are ready to perform event processing.

According to an aspect of the present invention, it is possible to eliminate unnecessary notification of the occurrence of events by notifying client apparatuses, of client apparatuses whose event notification requests have been registered, which are ready to perform event processing. This can reduce the load of an event communication process. In addition, this can improve the real-time performance of event notification which event notification is supposed to have.

According to an aspect of the present invention, there is provided communication system comprising a client apparatus and a service-providing apparatus which provides a service to the client apparatus through a communication channel, the client apparatus comprises:

an event processing unit configured to process an event occurring in the service-providing apparatus, a determination unit configured to determine a state of the event processing unit, and a first notification unit configured to notify the service-providing apparatus of whether or not the event processing unit is active, based on a determination result from the determination unit, and the service-providing apparatus comprises:

a detection unit configured to detect the occurrence of an event, and a second notification unit configured to notify a client apparatus in which the event processing unit is active of the occurrence of the event, based on a notification from the first notification unit, if the detection unit detects the occurrence of the event.

According to an aspect of the present invention, there is provided a communication apparatus which connects to a service-providing apparatus for providing a service through a communication channel, and for receiving a service from the service-providing apparatus, the communication apparatus comprises:

an event processing unit configured to process an event occurring in the service-providing apparatus;

a determination unit configured to determine a state of the event processing unit; and a first notification unit configured to notify the service-providing apparatus of whether or not the event processing unit is active, based on a determination result from the determination unit.

According to an aspect of the present invention, there is provided A control method of a communication system comprising a client apparatus and a service-providing apparatus which provides a service to the client apparatus through a communication channel, the method comprises the steps of:

the client apparatus determining a state of an event processing unit of the client apparatus, wherein the event processing unit processes an event occurring in the service-providing apparatus;

notifying the service-providing apparatus of whether or not the event processing unit of the client apparatus is active, based on the result of the determination step;

detecting occurrence of an event in the service-providing apparatus; and notifying by the service-providing apparatus, a client apparatus in which the event processing unit of the event is active, based on a notification from the client apparatus, if the occurrence of the event is detected in the detecting step.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 shows XML data describing the format of a management table according to the embodiment;

FIG. 5 depicts the format of a status notification message according to this embodiment;

DESCRIPTION OF THE EMBODIMENTS

Embodiments of the present invention will now be described in detail with reference to the accompanying drawings. The following embodiments are not intended to limit the claims of the present invention, and not all combinations of features described in the embodiments are essential for the present invention. It is, further, noted that the scope of the invention is not intended to be limited to the protocols, versions, addresses, other numerical values, and the like described in the embodiments, unless otherwise specified.

Figure 1:
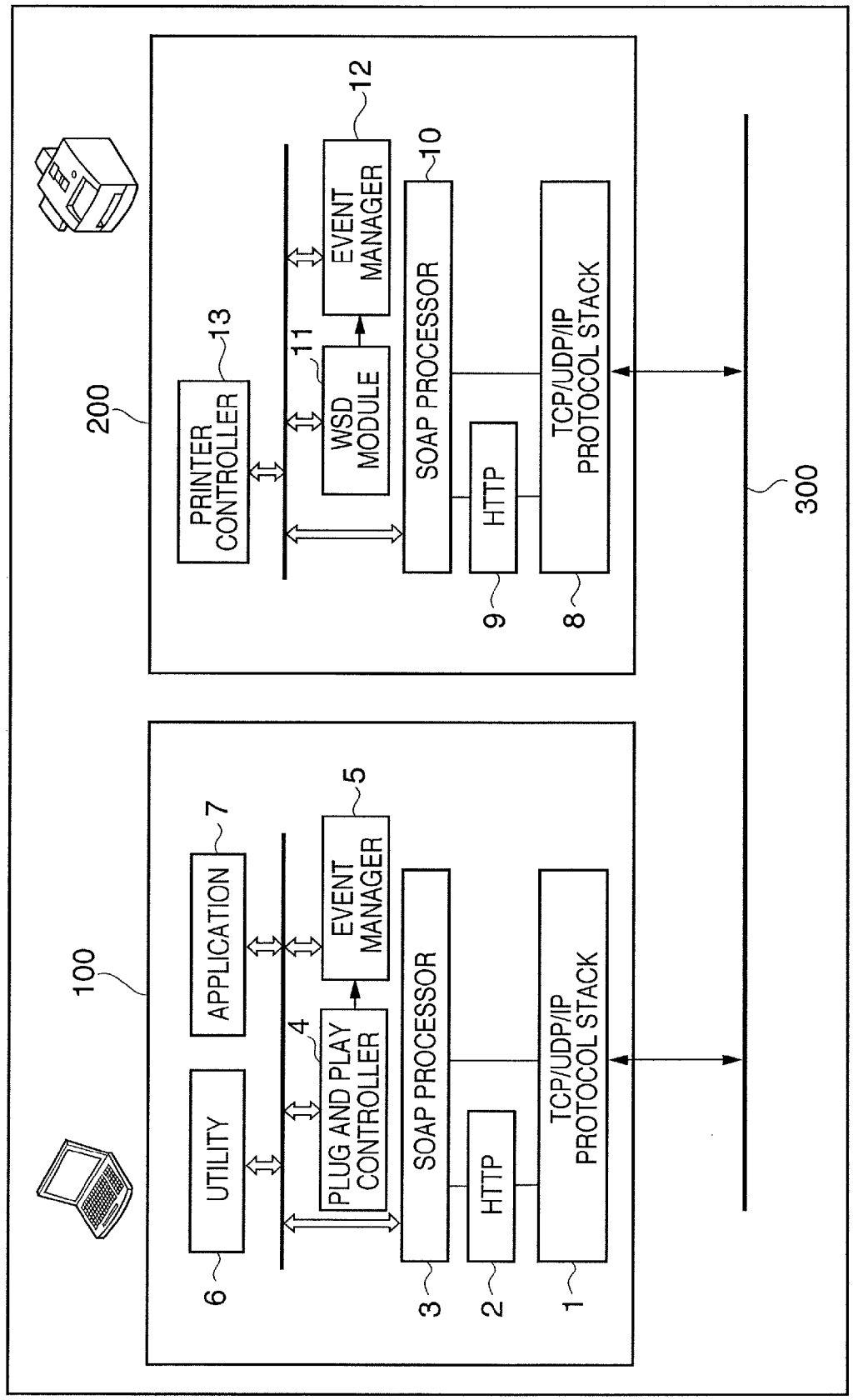
FIG. 1 is a block diagram showing the arrangement of a network plug and play system according to an exemplary embodiment of the present invention.

FIG. 1 is a block diagram showing the arrangement of a network plug and play system according to an exemplary embodiment of the present invention.

Referring to FIG. 1, reference numeral 100 denotes a client device, which has a communication function corresponding to Ethernet. The client device 100 comprises a TCP/UDP/IP protocol stack 1 and an HTTP processor 2 on the protocol stack 1. The client device 100 analyzes an HTTP request and performs response processing. The client device 100 comprises a SOAP (Simple Object Access Protocol) processor 3 on the upper layer of the TCP/UDP/IP protocol stack 1 and HTTP processor 2. In addition, a plug and play controller 4, an event manager 5, utilities 6, and applications 7 implement bidirectional communication of data described in XML.

The plug and play controller 4 executes response processing corresponding to a Hello message notified from a network device through the SOAP processor 3 based on the WS-Discovery specifications which have been developed by Microsoft and other companies. In addition, the plug and play controller 4 issues a Probe message for a search for a network device. The plug and play controller 4 also executes the processing of acquiring the attribute information of a network device by issuing a GetMetadata message based on the WS-MetadataExchange specifications.

If a network device 200 comprises an event notification function, the attribute information of the network device 200 records the registration destination information of an event notification request. The event manager 5 issues an event notification request (Subscribe message) to the registration destination of this event notification request through the SOAP processor 3 based on the WS-Eventing specifications which have been developed by Microsoft and other companies. Alternatively, the event manager 5 issues a cancellation request (UnSubscribe message) for event notification. The event manager 5 checks the presence/absence of event notification requests from the utilities 6 and applications 7. If one of the utilities 6 or applications 7 which is in an active state is requiring an event notification request, the event manager 5 issues a status message to the network device 200 through the SOAP processor 3. In addition, the event manager 5 has a function of issuing a status message to the network device 200 through the SOAP processor 3 when all of the utilities 6 and the applications 7 which are requiring event notification requests are not in an active state.

The event manager 5 receives the event information notified from the network device 200 through the SOAP processor 3. The event manager 5 then notifies the utilities 6 and applications 7, which have issued notification requests in advance, of the event. In this case, the utilities 6 and the applications 7 include software having functions of processing events notified from the network device 200, for example, printer driver dialog, printer queue view, and a network management application.

The network device 200 will be described next.

In this embodiment, the network device 200 has a communication function corresponding to Ethernet. The network device 200 comprises a TCP/UDP/IP protocol stack 8 and an HTTP processor 9 on the protocol stack 8. The network device 200 analyzes an HTTP request and performs response processing. The network device 200 includes a SOAP processor 10 on the upper layer of the TCP/UDP/IP protocol stack 8 and an HTTP processor 9. A WSD module 11, an event manager 12, and a printer controller 13 implement bidirectional communication of data described in XML through the SOAP processor 10.

When connecting to a network 300, a WSD module 11 transmits a Hello message through the SOAP processor 10 based on the WS-Discovery specifications which have been developed by Microsoft and other companies. In addition, the WSD module 11 executes response processing with respect to a Probe message issued from the client device 100. The WSD module 11 also returns attribute information, which the network device 200 (a network printer in this embodiment) has, in accordance with a GetMetadata message issued from the client device 100 based on the WS-MetadataExchange specifications.

The event manager 12 has a function of managing an event notification request (Active) and event notification cancellation request (InActive) notified from the client device 100 for each of a plurality of client devices including the client device 100. The event manager 12 manages printer status information notified from the printer controller 13, and generates corresponding event data. The event manager 12 also has a function of transmitting an event message to the client device 100 through the SOAP processor 10.

A control procedure in the network plug and play system according to this embodiment will now be described with reference to the flowcharts in FIGS. 2A, 2B, and 3.

First Embodiment

Figure 2A:
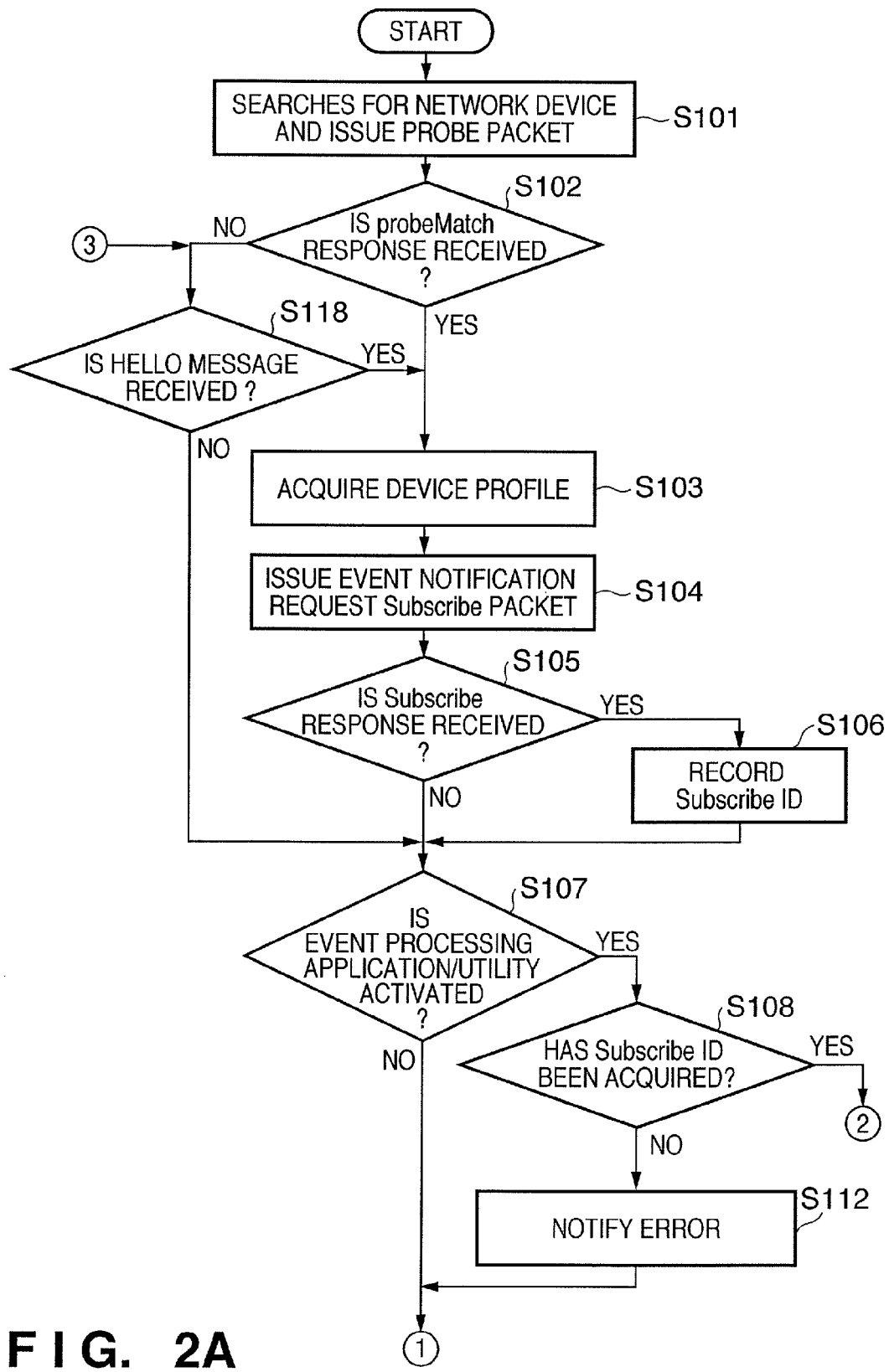
FIGS. 2A and 2B are flowcharts for explaining control processing in a client device according to the first embodiment of the present invention.
Figure 2B:
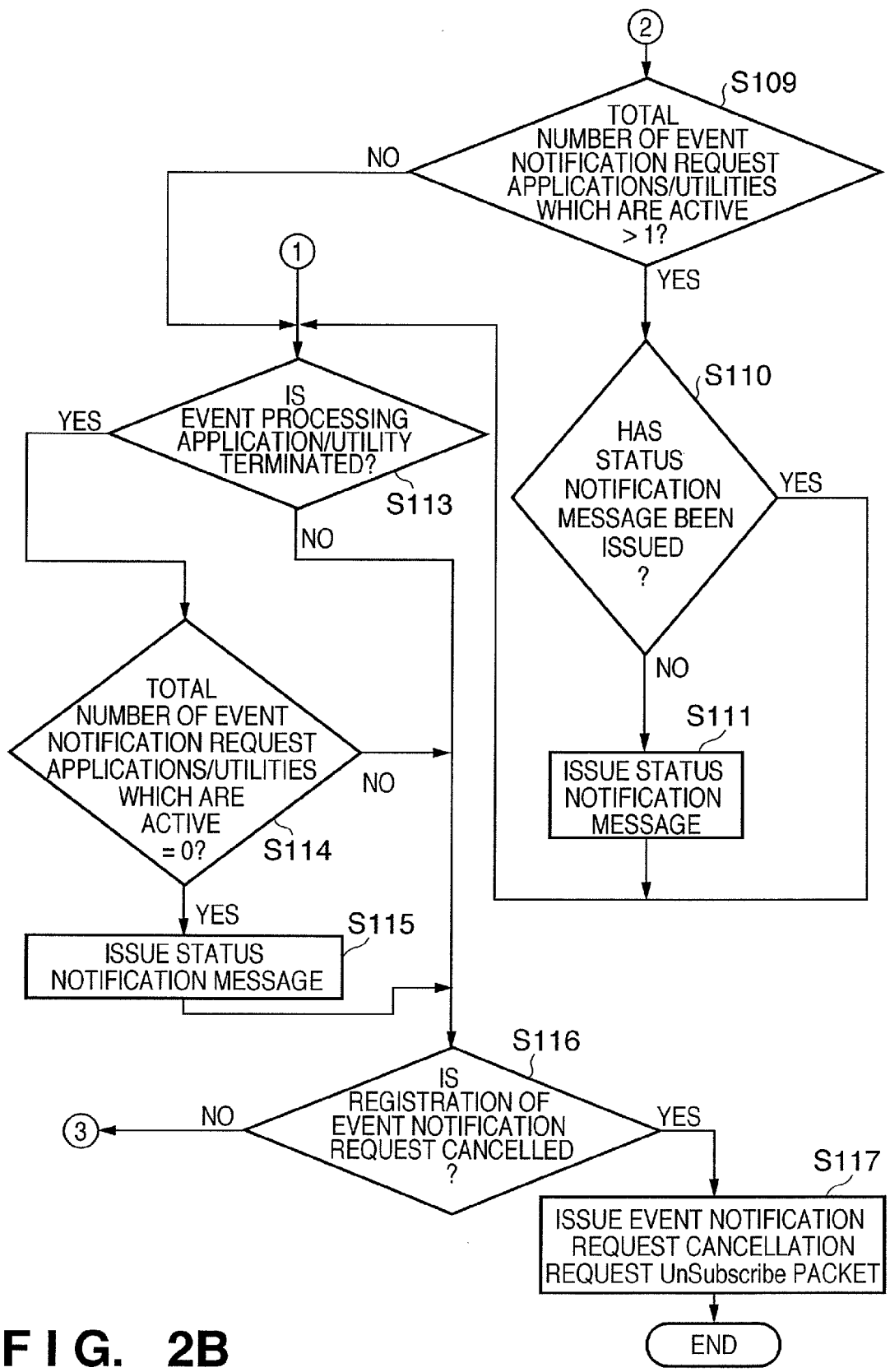

FIGS. 2A and 2B are flowcharts for explaining control processing in a client device 100 according to the first embodiment. FIG. 3 is a flowchart for explaining control processing in a network device 200 according to the first embodiment.

First of all, in step S101, a plug and play controller 4 of the client device 100 searches for a service-providing device which can be used on a network 300, that is, the network device 200. In this case, the plug and play controller 4 issues a network device search packet (Probe packet) defined by the WS-Discovery specifications through the SOAP processor 3 in step S101. In step S102, the plug and play controller 4 determines whether or not a response has been received. If YES in step S102, the process advances to step S103 to acquire the device profile of the device which has transmitted the response.

Figure 3:
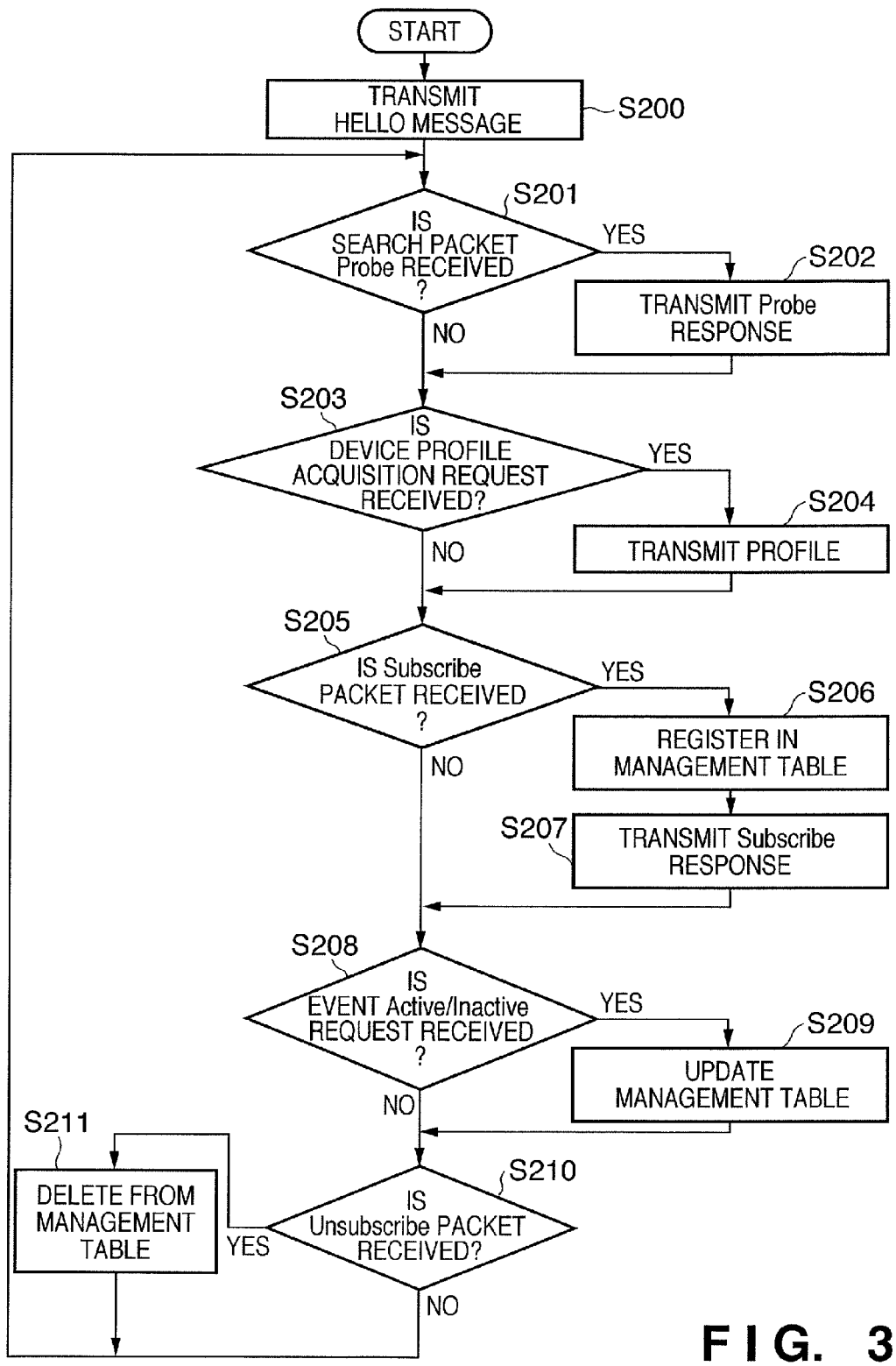
FIG. 3 is a flowchart for explaining control processing in a network device according to the first embodiment.

On the other hand, the network device 200 transmits a Hello message in step S200 in FIG. 3, and then in step S201, the network device 200 waits for a reception of the Probe packet transmitted from the client device 100 in step S101 described above. When the network device 200 receives this packet in step S201, the process advances to step S202, in which the WSD module 11 of the network device 200 transmits address information for the acquisition of profile information to the client device 100 in response to the packet. In this case, the network device 200 describes the information in a ProbeMatch response and returns it to the client device 100 as a response packet defined by the WS-Discovery specifications through the SOAP processor 10.

With this operation, the plug and play controller 4 of the client device 100, which has received this ProbeMatch response in step S102, acquires the profile information of the network device 200 which has issued the response in step S202. In this case, the client device 100 issues a GetMetadata request defined by the WS-MetadataExchange specifications to the address described in the previously received ProbeMatch response through the SOAP processor 3. Note that a plurality of network devices may exist on the network 300. For this reason, the client device 100 selects devices to be used from the network devices which have returned the ProbeMatch responses. The client device 100 then acquires the profile information of all the selected network devices.

With this operation, if the network device 200 receives the GetMetadata request in step S203 in FIG. 3, the process advances to step S204, in which the WSD module 11 causes the SOAP processor 10 to transmit profile information to the client device 100.

With this operation, the client device 100 acquires profile information from the network device 200. The plug and play controller 4 then notifies the event manager 5 of the event notification request registration address described in the profile information. With this operation, the event manager 5 issues an event notification registration request (Subscribe request) defined by the WS-Eventing specifications with respect to the address through the SOAP processor 3 (Step S104).

With this operation, in step S205, the network device 200 receives this Subscribe request. The process then advances from step S205 to step S206, in which the event manager 12 generates SubscribeID for uniquely identifying the client device 100. The network device 200 stores SubscribeID and the address information of the event notification destination of the client device 100 which is described in the Subscribe request as a management table.

FIG. 4 depicts a view showing XML data describing the format of this management table.

In this case, the value of SubscribeID which the event manager 12 assigns to the client device 100 is described in <SuscribeID> tag 400 in the form of an attribute value. In <EventPort> tag 401, the event notification address information of the client device 100 is described in URL form. In addition, <Status> 402 is used to store the operating state of event processing software in the client device 100 (which will be described later), and Active (in service) or Inactive (out of service) is described in accordance with the operating state. Pieces of information corresponding to the respective registered client devices are stored as a table in such a format.

The process advances to step S207, in which the event manager 12 describes generated SubscribeID in the Subscribe response packet defined by the WS-Event specifications. The event manager 12 then transmits the Subscribe response to the client device 100 through the SOAP processor 10.

With this operation, in step S105, the client device 100 receives this Subscribe response, and the process advances to step S106, in which the event manager 5 stores SubscribeID described in this packet. The process then advances to step S107.

In step S107, the event manager 5 of the client device 100 determines whether the utilities 6 and the applications 7, which function on the upper layer, are active. In this case, the event manager 5 determines whether at least one piece of software, of the utilities 6 or the applications 7, which process the event notified from the network device 200, for example, driver dialog, print queue view, and network device management software, is active. In this case, if at least one piece of the software is active, they operate to register an event notification request in the event manager 5.

If the event manager 5 determines in step S107 that one of the utilities 6 or the applications 7 is active, and receives the registration of the event notification request from these pieces of software, the process advance to step S108, in which the event manager 5 determines whether SubscribeID has been acquired. If SubscribeID has already been acquired from the network device 200, the process advances from step S107 to step S109 (FIG. 2B). In step S109, the event manager 5 determines whether the total number of the utilities 6 and applications 7 which have issued the event notification requests and are active is equal to or more than "1". If YES in step S109, the process advances to step S110. In step S110, the event manager determines whether a status notification message has already been issued. If NO in step S110, the process advances to step S111, in which the event manager 5 issues a status notification message (Active) to the network device 200 through the SOAP processor 3. The process then advances to step S113.

If the event manager 5 determines in step S109 that the total number of the utilities 6 and the applications 7 which have issued the event notification requests and are active is "0" or determines in step S110 that a status notification message has already been issued, the process advances to step S113 without issuing any status notification message. If the event manager 5 determines in step S108 (FIG. 2A) that SubscribeID has not been acquired, the process advances to step S112, in which the event manager 5 notifies the utilities 6 or applications 7 of an error. The process then advances to step S113.

FIG. 5 depicts a view for explaining the format of a status notification message. The SOAP processor 3 converts this message into a SOAP envelope form, and then transmits it to the network device 200.

In this case, in <SubscribeID> 500, the identifier (SubscriptionID) acquired from the network device 200 in step S106 (FIG. 2A) is described. In <Status> 501, the operating state of the utility 6 or application 7 which issued the event notification request is described. When the utility 6 or application 7 is in service, its operating state is described as "Active".

If the network device 200 receives this status notification message in step S208 in FIG. 3, the process advances to step S209, in which the event manager 12 refers to SubscribeID described in the status notification message by using the above management table. The event manager 12 then searches the management table for the corresponding client device information, and updates the <Status> field in the management table in accordance with the content of received <Status> 501 (FIG. 5). The process then advances to step S210.

On the other hand, if the event manager 5 determines in step S107 in FIG. 2A that any one piece of software, of the utilities 6 and applications 7, which processes an event from a network device, for example, driver dialog, print queue view, and network device management software, is not active, the process advances to step S113 (FIG. 2B). The piece of software notifies the event manager 5 of the cancellation of the registration of the event notification request. If the event manager 5 receives the cancellation of the registration of the event notification request from any one of the utilities 6 and the applications 7 in step S113, the process advances to step S114. In step S114, the event manager 5 determines whether the total number of utilities 6 and applications 7 which have issued the event notification requests and are active is "0". If the result is YES in step S114, the process advances to step S115 to issue a status notification message to the network device 200 through the SOAP processor 3 and then the process advances to step S116. In this case, the event manager 5 describes "Inactive" in the <Status> tag 501 shown in FIG. 5 described above.

If the event manager 5 determines in step S114 that the total number of utilities 6 and applications 7 which require event notifications and are active is equal to or more than "1", or if the event manager 5 does not receive the cancellation of the registration of the event notification request from any one of the utilities 6 and the applications 7 in step S113, the process advances to step S116 without issuing any status notification message. In step S116, the event manager 5 determines whether it is necessary to cancel the registration of an event notification request. If the result is YES in step S116, the process advances to step S117. If the result is NO in step S116, the process advances to step S118 (FIG. 2A).

With this operation, upon receiving the status notification message issued in step S115, the network device 200 receives the status notification message in step S208 as described above. In step S209, the network device 200 changes the <Status> field in the management table in accordance with the content of the received message.

In this manner, the event manager 5 of the client device 100 repeats the processing in steps S107 to S116 described above, and monitors the operating states of the utilities 6 and the applications 7 which execute event processing.

Note that in a case that the operating state of the client device 100 shifts to a resting (standby) state or shuts down, the process advances from step S116 to step S117 in FIG. 2B. In step S117, the event manager 5 issues a registration cancellation request (UnSubscribe request) for an event notification request, which is defined by the WS-Eventing specifications, to the network device 200 through the SOAP processor 3.

With this operation, the network device 200 receives this UnSubscribe request in step S210 (FIG. 3). The event manager 12 of the network device 200 then refers to SubscribeID described in the UnSubscribe request in the above management table in step S211. The event manager 12 then searches the management table for the corresponding client device, and deletes the information of the corresponding client device from the management table.

If the client device 100 cannot receive the ProbeMatch response in step S102 in FIG. 2A, the process advances to step S118. The plug and play controller 4 monitors in step S118 whether the client device 100 has received the Hello message transmitted from the network device 200 participating in the network 300. If the result is YES in step S118, the process advances to step S103 to execute the subsequent processing. If the client device 100 has not received the Hello message in step S118, the process advances to step S107.

Note that the Hello message is a packet issued at the time the network device 200 is activated to be ready to provide a service on the network 300. In this case, this packet is defined by the WS-Discovery specifications and issued in step S200 in FIG. 3.

Figure 6:
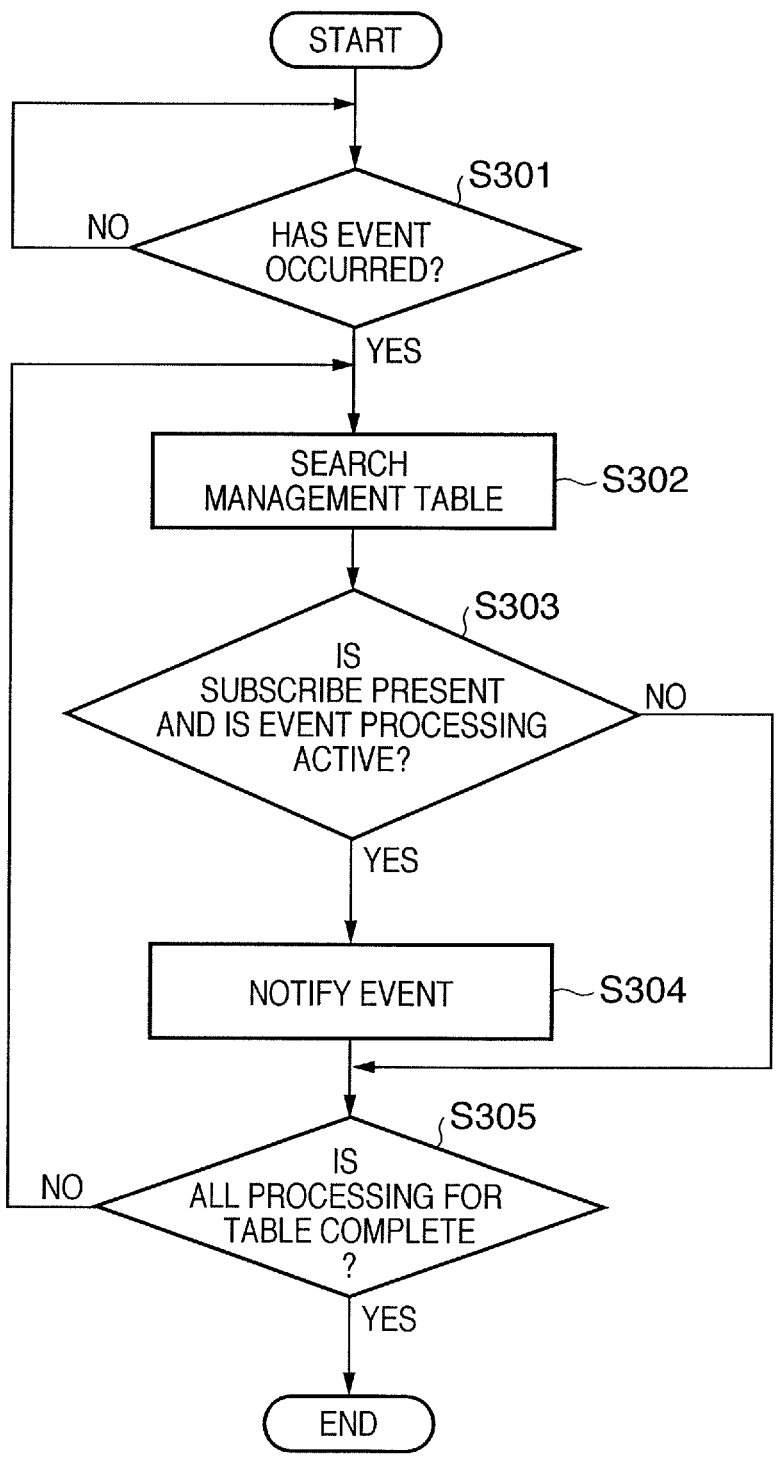
FIG. 6 is a flowchart showing a control processing procedure in a case wherein an event has occurred in the network device according to the first embodiment.

FIG. 6 is a flowchart showing a control processing procedure in a case where an event occurs in the network device 200 according to the first embodiment.

This flowchart shows processing of the network device 200, that is, a network printer. The processing is activated at the occurrence of an event associated with a change in transition state concerning a job, an event associated with an error, an event associated with a change of an option apparatus, an event associated with a change in setting, or the like. First of all, in step S301, it is determined whether or not some kind of event occurs. If some kind of event occurs, then the printer controller 13 notifies the event manager 12 of the occurrence of the event. The process then advances to step S302, in which the event manager 12 which has received this notification searches the management table. In step S303, the event manager 12 determines whether Subscribe information is described and <Status> is "Active". If the result is YES in step S303, the process advances to step S304 to notify the occurrence of the event with respect to the address described in the management table.

In this case, the event manager 12 describes the event notified by the printer controller 13 in XML in accordance with the format of Notifications defined by the WS-Eventing specifications. The event manager 12 further transmits the resultant information to the client device 100 through the SOAP processor 10.

If the printer controller 13 determines in step S303 that Subscribe information is not described in the management table or <Status> is "InActive" although Subscribe information is described in the management able, the process skips step S304 and advances to step S305. With this operation, the client device 100, in which all the utility 6 and the application 7 which execute the event processing are inactive, is not notified of the event.

In step S305, the event manager 12 determines whether or not the notification processing of an event concerning all pieces of DescriptionID information recorded in the management table is complete. If the result is NO in step S305, the process returns to step S302 to search the management table and execute the above processing, otherwise the process is terminated.

On the other hand, upon receiving the event notification from the network device 200, the event manager 5 of the client device 100 notifies the utility 6 or application 7 whose event notification request has been registered of the received event information.

As described above, according to the first embodiment, a series of control processing described in the flowcharts of FIGS. 2A and 2B, 3, and 6 is executed. This makes it possible to control the network device 200 to notify an event only when any one of the utility 6 or application 7 which executes the event processing is active in the client device 100, which is a characteristic feature of the first embodiment.

This makes it possible to notify the occurrence of an event to only a client device, of the client devices whose event notification requests have been registered, which is to perform the event processing. Therefore, unnecessary notification of the occurrence of events can be avoided.

In addition, this can reduce the load of an event communication process and give notification of the occurrence of an event in real time.

Second Embodiment

In the first embodiment described above, the event manager 5 of the client device 100 issues a status notification request to the network device 200 in accordance with the operating states of the utilities 6 and applications 7 which function on the upper layer.

If the client device 100 is a client device in which the number of utilities 6 and applications 7 which are inactive is small, it is possible to perform control by using only Subscribe information sent to the network device 200 to determine whether to issue an event notification request.

The second embodiment of the present invention will be described below with reference to FIGS. 7A, 7B and 8. Note that the configurations of an apparatus and system arrangement according to the second embodiment are the same as those in the first embodiment, and a repetitive description will be omitted.

Figure 7A:
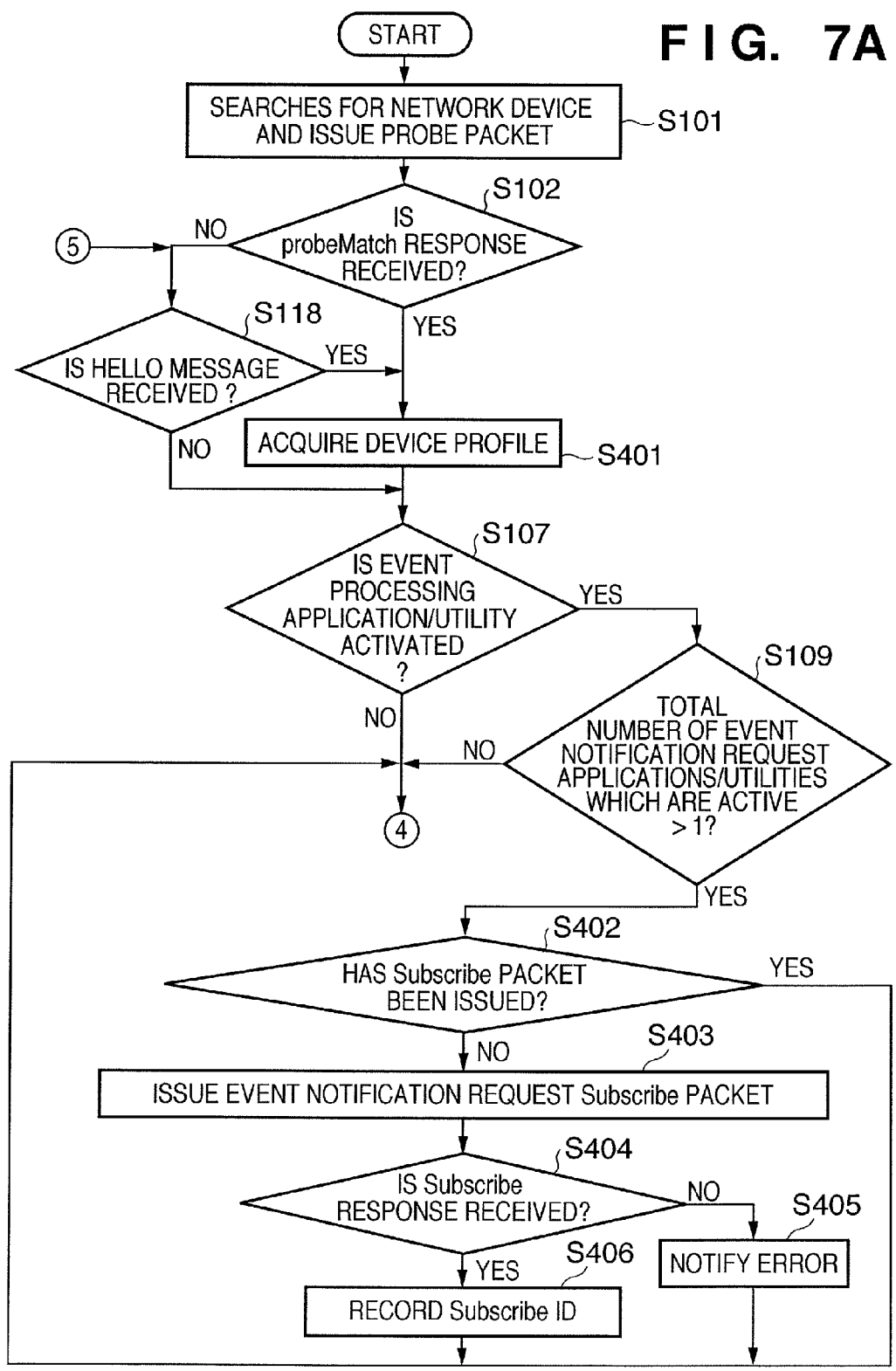
FIGS. 7A and 7B are flowcharts for explaining control processing in a client device according to the second embodiment of the present invention.
Figure 7B:
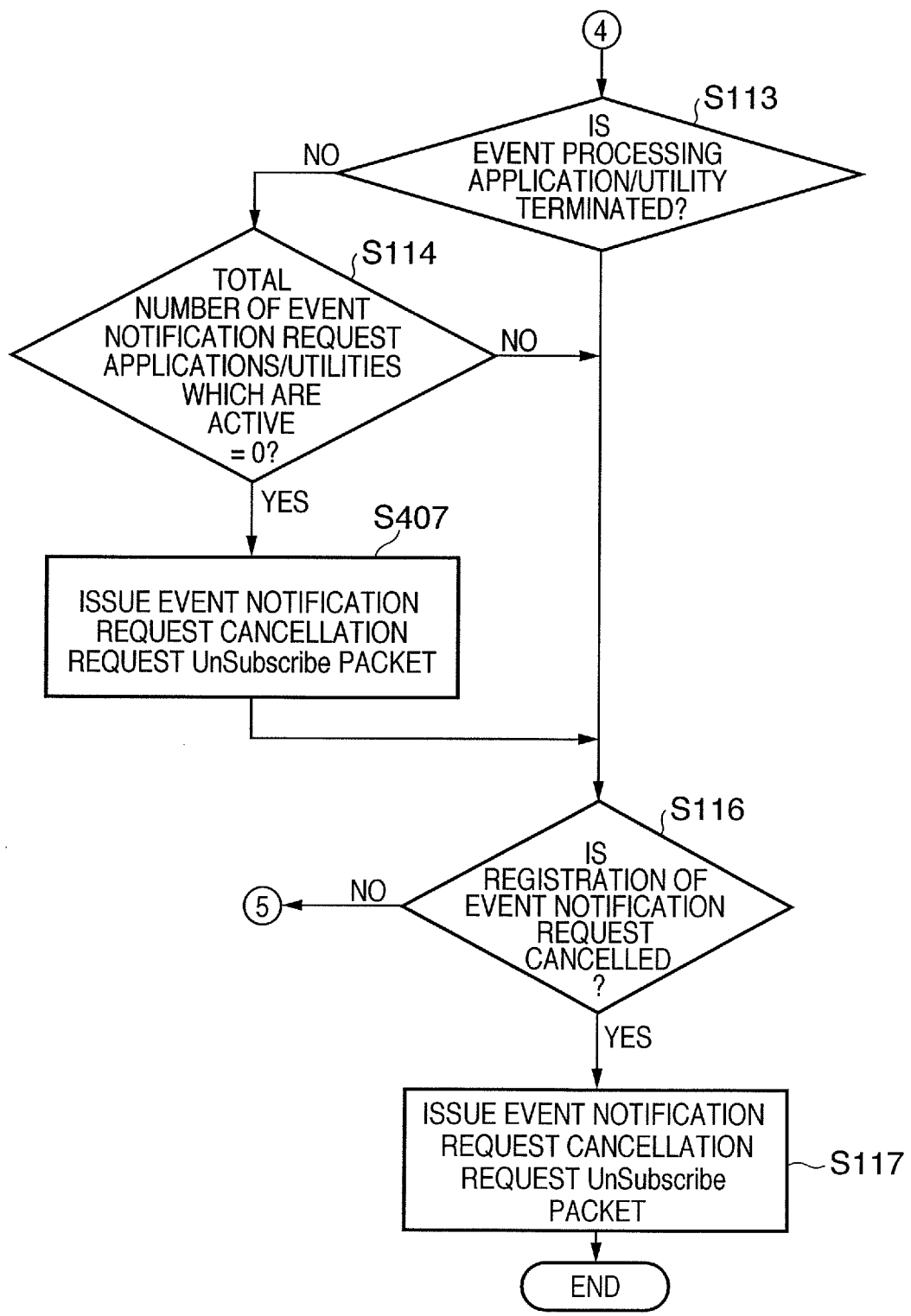

FIGS. 7A and 7B are flowcharts for explaining control processing in a client device 100 according to the second embodiment of the present invention. FIG. 8 is a flowchart for explaining control processing in a network device 200 according to the second embodiment. The same step numbers as in FIGS. 7A, 7B and 8 denote processes common to those in FIGS. 2A, 2B and 3, and a repetitive description will be omitted.

Upon acquisition of device information in step S401, the event manager 5 of the client device 100 monitors the operating states of the utilities 6 and the applications 7 which function on the upper layer.

If at least one piece of software, of the utilities 6 and applications 7, which processes an event from a network device, for example, driver dialog, print queue view, and network device management software, is active, the piece of software registers an event notification request with respect to the event manager 5.

When the event manager 5 receives a registration request for an event notification request from a utility 6 or application 7 in this manner in step S107, the process advances to step S109. In step S109, the event manager 5 determines whether the total number of the utilities 6 and applications 7 which have issued event notification requests and are active is equal to or more than "1". If the result is YES in step S109, the process advances to step S402 to determine whether a registration request for an event notification request (Subscribe request) has been issued. If the result is NO in step S402, the process advances to step S403 to issue a registration request for an event notification request (Subscribe request) defined by the WS-Eventing specifications to the network device 200 through the SOAP processor 3. Note that if the event manager 5 determines in step S402 that a Subscribe request has been issued, the process advances to step S113 (FIG. 7B).

Figure 8:
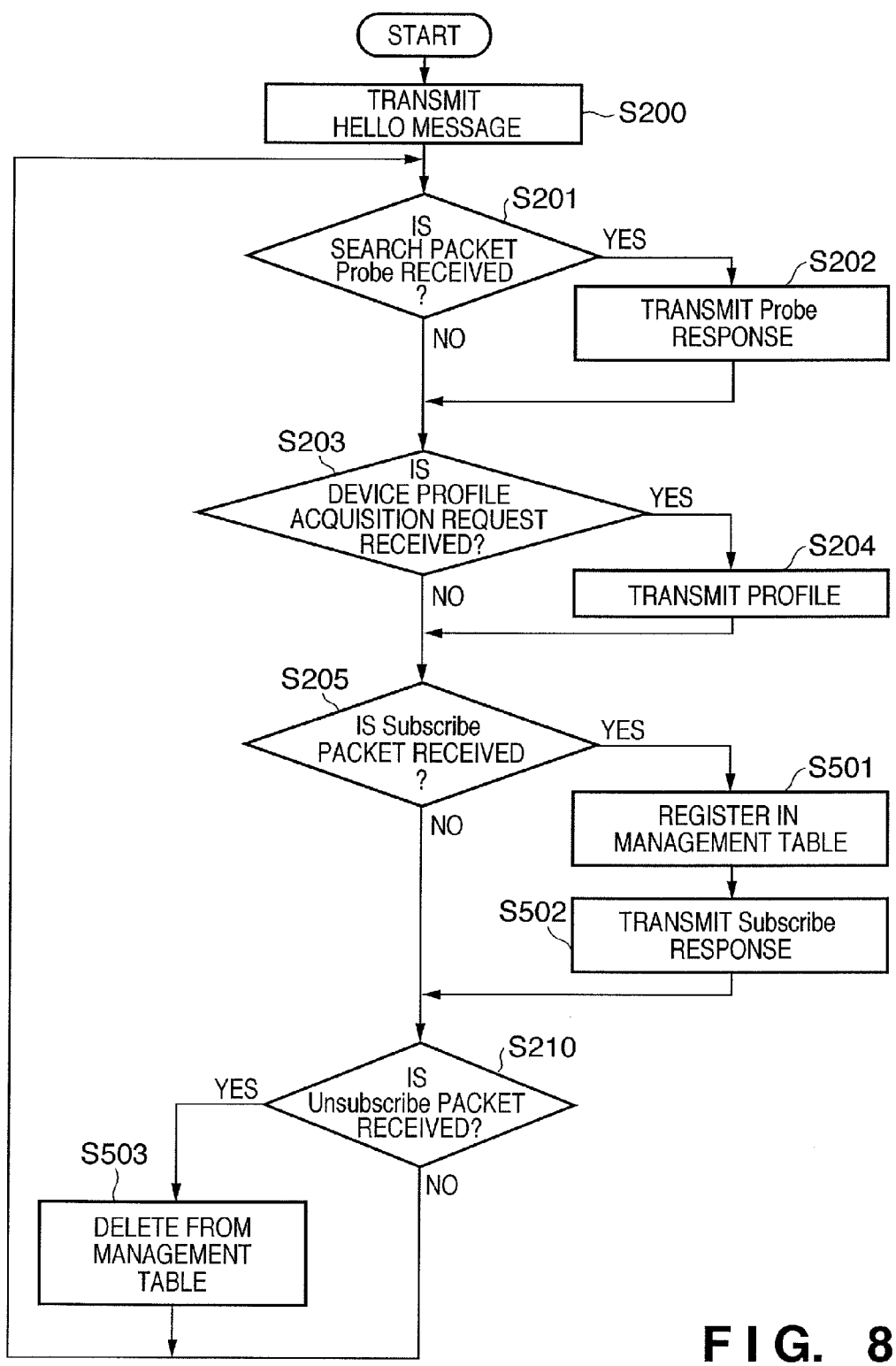
FIG. 8 is a flowchart for explaining control processing in the network device according to the second embodiment.

When the event manager 12 of the network device 200 receives this Subscribe request in step S205 in FIG. 8, the process advances to step S501 (FIG. 8) to generate SubscribeID for uniquely identifying the client device. The event manager 12 then registers SubscribeID and the event notification destination address information of the client device 100 described in the Subscribe request in the management table. Next, in step S502, the event manager 12 describes generated SubscribeID in a Subscribe response packet defined by the WS-Event specifications. The event manager 12 then transmits the Subscribe response to the client device 100 through the SOAP processor 10.

With this operation, the client device 100 determines in step S404 whether this Subscribe response has been received. If the result is NO in step S404, the process advances to step S405 to give notification of an error. The process then advances to step S113 (FIG. 7B). If the result is YES in step S404, the process advances to step S406, in which the event manager 5 stores SubscribeID described in the packet. The process then advances to step S113 (FIG. 7B).

In step S113 of FIG. 7B, the event manager 5 checks the states of pieces of software, of the utilities 6 and applications 7, which process an event from the network device 200, for example, driver dialog, print queue view, and network device management software. If all pieces of software which process the event are terminated, then the software notifies the event manager 5 of the cancellation of the registration of the event notification request.

If the event manager 5 receives the registration cancellation of the event notification request from one of the utilities 6 and the applications 7, the process advances from step S113 to step S114 (FIG. 7B). In step S114, the event manager 5 determines whether the total number of utilities 6 and the applications 7 which have issued the event notification requests and are active is "0". If YES in step S114, the process advances to step S407 (FIG. 7B) to issue a registration cancellation request (UnSubscribe request) for an event notification request which is defined by the WS-Eventing specifications to the network device 200 through the SOAP processor 3.

With this operation, the event manager 12 of the network device 200 receives this UnSubscribe request in step S210 of FIG. 8, and the process advances to step S503. In step S503, the event manager 12 refers to SubscribeID described in the UnSubscribe request in the above management table. The event manager 12 then searches the management table for the information of the corresponding client device, and deletes the information of the corresponding client device from the management table.

In this manner, in a case that an event occurs in the network device 200, the event manager 12 searches the management table. If Subscribe information is described in the table, the event manager 12 gives notification of the occurrence of the event with respect to the address described in the management table.

The above processing allows issuing an event notification request to the network device 200 only when at least one of the utility 6 or application 7 which can execute event processing is active in the client device 100.

This makes it possible to give notification of the occurrence of an event to only a client device, of the client devices whose event notification requests have been registered, which is ready to perform the event processing. Therefore, unnecessary notification of the occurrence of events can be avoided.

In addition, this can reduce the load of an event communication process and give notification of the occurrence of an event in real time.

In the first and second embodiments described above, in steps S111 and S115 in FIG. 2B, the event manager 5 issues a status notification message to the network device 200 in accordance with the operating states of the utilities 6 and applications 7 which can process the event.

Assume that the client device 100 can simultaneously execute a plurality of utilities 6 and applications 7, and each software program has a function of displaying a user interface in window form. In this case, it is possible to request the event manager 5 to register an event notification request and, even if the corresponding software is active, to make the event manager 5 monitor whether a window for the corresponding software is in focus (i.e., active). If the total number of pieces of software, of utilities 6 and applications 7 which have issued event notification requests, whose windows are in focus is equal to or more than "1", the event manager 5 issues a status notification message to the network device 200. This makes it possible to give notification of the occurrence of a requested event only when at least one of the utilities 6 and the applications 7 which execute event processing is active in the client device 100 and a window as user interfaces for the of software is in focus.

According to the first and second embodiments, when all the utilities 6 and applications 7 which execute event processing are inactive in the client device 100, the network device 200 does not notify the client device 100 of any event. However, it is possible to notify the client device 100 of the occurrence of predetermined events such as an important error status and a change in status associated with a change of the arrangement of a device regardless of whether the utilities 6 or the applications 7 are active.

In addition, the first and second embodiments described above use the protocols defined by WS-Discovery and WS-Eventing specifications as means for searching for a network device, notifying the participation of a network device in a network, and registering and notifying an event. However, the present invention is not limited to this. For example, it suffices to use SSDP (Simple Service Discovery Protocol) and GENA (General Event Notification Architecture) defined by UPnP (tm)v1.

As a search protocol for a network device, the present invention can use any protocol which can acquire an address for the acquisition of the attribute information of a network device and control information transmission destination for controlling the network device.

As an event registration/notification means, the present invention can use any protocol which can issue an event notification request and notify an event transmission destination through a network, and can also transmit an occurred event to a request source which has issued an event notification request.

The first and second embodiments have exemplified the printer as a network device. However, a network device may be office equipment such as a copying machine, a scanner, or storage device or a home electric appliance such as a TV set, a refrigerator, or an air conditioner as long as it is a device which can be used and controlled through a communication channel.

The respective processing functions in the client device 100 and network device 200 according to the above embodiments are implemented by reading out programs for implementing the respective processing functions and causing a CPU (Central Processing Unit) to execute them. However, the present invention is not limited to this, and all or some of the processing functions may be implemented by dedicated hardware. In addition, the above memory may be a nonvolatile memory such as a magnetooptical disk, a readable storage medium such as a CD-ROM, a volatile memory other than a RAM, or a computer-readable/writable storage medium comprising a combination thereof.

It is possible to store, in a computer-readable storage medium, programs for implementing the respective functions in the client device 100 and network device 200, and perform the respective processes by causing the computer system to read and execute the programs. Note that the "computer system" in this case includes an OS and hardware such as peripheral devices. More specifically, the programs read out from the storage medium are written in the memory of a function expansion board inserted into the computer or a function expansion unit connected to the computer. The CPU of the function expansion board or function expansion unit then performs part or all of actual processing based on the instructions of the programs, thereby implementing the functions of the above embodiments.

In addition, the "computer-readable storage medium" is a portable medium such as a flexible disk, magnetooptical disk, ROM, or a CD-ROM or a storage device such as a hard disk built in the computer system. Furthermore, the "computer-readable storage medium" is a medium holding programs for a predetermined period of time, for example, a server to which the programs are transmitted through a network such as the Internet or a communication line such as a telephone line or a volatile memory (RAM) in a computer system serving as a client.

It is possible to transmit the above programs from the computer system which stores the programs in a storage device or the like to another computer system through a transmission medium or carrier waves in the transmission medium. In this case, the "transmission medium" is a medium having a function of transmitting information, for example, a network such as the Internet or a communication line such as a telephone line.

Each of the above programs may be one that implements part of a corresponding one of the functions described above or may be one that can implement the function in combination with a program which has already been recorded in the computer, that is, a differential file (differential program).

Furthermore, a program product such as computer-readable storage medium storing the above programs can be applied as an embodiment of the present invention. The scope of the present invention incorporates the above programs, storage medium, transmission medium, and program product.

Although the embodiments of the present invention have been described in detail above, the specific arrangements of the present invention are not limited to the embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2006-238173, filed Sep. 1, 2006, which is hereby incorporated by reference herein in its entirety.

What is claimed is:

1. A communication system comprising a client apparatus and a service-providing apparatus, the service-providing apparatus configured to notify an occurrence of an event to the client apparatus and provide a service, and the client apparatus configured to execute event processing for processing the event notified by the service-providing apparatus, wherein the client apparatus comprises:
a hardware storage unit configured to store a first program; and
a processing unit configured to execute the first program,
wherein the processing unit, as a result of executing the first program, receives information for notifying that the service-providing apparatus is active from the service-providing apparatus, sends to the service-providing apparatus a notification request for requesting the service-providing apparatus to notify an occurrence of the event if the information for notifying that the service-providing apparatus is active is received, sends to the service-providing apparatus active information indicating that the event processing is active if the event processing is active, and sends to the service-providing apparatus inactive information indicating that the event processing is inactive if the event processing changes from active to inactive, wherein the service-providing apparatus comprises:
a hardware storage unit configured to store a second program; and
a processing unit configured to execute the second program,
wherein the processing unit of the service-providing apparatus, as a result of executing the second program, sends the information for notifying that the service-providing apparatus is active to the client apparatus, and notifies the occurrence of the event to the client apparatus in a case where the client apparatus sent the notification request and the active information and did not send the inactive information to the service-providing apparatus, based on the notification request and the active information sent by the client apparatus, if the occurrence of the event is detected, wherein the processing unit of the service-providing apparatus does not notify the occurrence of the event to the client apparatus in a case where the client apparatus sent the notification request, the active information, and the inactive information to the service-providing apparatus, even if the occurrence of the event is detected, wherein the processing unit of the client apparatus sends information for searching for the service-providing apparatus, and wherein the processing unit of the service-providing apparatus sends the information for notifying that the service-providing apparatus is active in response to the information for searching for the service-providing apparatus.

2. The system according to claim 1, wherein the processing unit of the service-providing apparatus is configured to manage one or more of a) identification information of the client apparatus which has issued the notification request, b) an address of the client apparatus, and c) information representing a state of the event processing of the client apparatus.

3. The system according to claim 1, wherein the processing unit of the client apparatus sends to the service-providing apparatus the active information indicating that the event processing is active, if at least one event processing is active.

4. The system according to claim 1, wherein the processing unit of the client apparatus sends to the service-providing apparatus the active information indicating that the event processing is active in a case that at least one event processing transits into an active state.

5. The system according to claim 4, wherein the processing unit of the client apparatus sends to the service-providing apparatus the inactive information indicating that the event processing is inactive, in a case that a number of active event processings is 0.

6. The system according to claim 1, wherein the first communication unit sends to the service-providing apparatus the active information if it is determined that the event processing is active.

7. The system according to claim 1, wherein the processing unit of the service-providing apparatus sends the information for notifying that the service-providing apparatus is active in response to the service-providing apparatus being activated.

8. A control method of a communication system comprising a client apparatus and a service-providing apparatus, the service-providing apparatus configured to notify an occurrence of an event to the client apparatus and provide a service, and the client apparatus configured to execute event processing for processing the event notified by the service-providing apparatus, the method comprising the steps of:

sending from the service-providing apparatus to the client apparatus information for notifying that the service-providing apparatus is active;

sending from the client apparatus to the service-providing apparatus a notification request for requesting the service-providing apparatus to notify an occurrence of the event, if the information for notifying that the service-providing apparatus is active is received by the client apparatus;

sending from the client apparatus to the service-providing apparatus active information indicating that the event processing is active, wherein the event processing processes the event notified by the service-providing apparatus if the event processing is active;

sending from the client apparatus to the service-providing apparatus inactive information indicating that the event processing is inactive if the event processing changes from active to inactive;

detecting occurrence of the event in the service-providing apparatus; and notifying the occurrence of the event from the service-providing apparatus to the client apparatus in a case where the client apparatus sent the notification request and the active information and did not send the inactive information to the service-providing apparatus, based on the notification request and the active information received from the client apparatus, if the occurrence of the event is detected, wherein the occurrence of the event is not notified from the service-providing apparatus to the client apparatus in a case where the client apparatus sent the notification request, the active information, and the inactive information to the service-providing apparatus, even if the occurrence of the event is detected, and wherein the method further comprises the steps of:

sending from the client apparatus information for searching for the service-providing apparatus, and sending from the service-providing apparatus the information for notifying that the service-providing apparatus is active in response to the information for searching for the service-providing apparatus.

9. The method according to claim 8, wherein the client apparatus sends to the service-providing apparatus the active information indicating that the event processing is active, if at least one event processing is active.

10. The method according to of claim 8, wherein the client apparatus sends to the service-providing apparatus the active information indicating that the event processing is active, if at least one event processing transits to an active state.

11. The method according to claim 8, wherein the client apparatus sends to the service-providing apparatus the active information indicating that the event processing is inactive, if a number of active event processings of the client apparatus is 0.

* * * * *